United States Patent

[11] 3,555,324

| [72] | Inventor | Henry Joseph Lovegrove<br>Great Hormead, England |
|---|---|---|
| [21] | Appl. No. | 828,977 |
| [22] | Filed | May 29, 1969 |
| [45] | Patented | Jan. 12, 1971 |
| [73] | Assignee | Sangamo Weston Limited<br>Enfield, Middlesex, England<br>a British company |
| [32] | Priority | May 30, 1968 |
| [33] | | Great Britain |
| [31] | | No. 25979/68 |

[54] SYNCHRONOUS MOTOR WITH DISCLIKE ROTOR
7 Claims, 6 Drawing Figs.

[52] U.S. Cl. ................................................. 310/162,
310/156
[51] Int. Cl. ........................................................ H02k 19/00
[50] Field of Search ........................................... 310/162,
163, 268, 164, 156, 174, 257, 168, 90; 339/17,
17C, 32

[56] References Cited
UNITED STATES PATENTS

| 2,192,304 | 3/1940 | Gilliver | 310/164 |
| 2,823,327 | 2/1958 | Kohlhagen | 310/162 |
| 3,111,596 | 11/1963 | Lovegrove | 310/162 |
| 3,271,601 | 9/1966 | Raver | 310/168 |
| 3,343,118 | 9/1967 | Holzer | 339/17C |
| 3,390,291 | 6/1968 | Eberline | 310/156 |

*Primary Examiner*—Milton O. Hirshfield
*Assistant Examiner*—R. Skudy
*Attorney*—Young and Thompson ABSTRACT: Miniature alternating current synchronous electric motor comprising a stator structure including a cylindrical nonretentive ferromagnetic core-piece containing internal bearing bushings for a rotor spindle and two cup-shaped members of nonretentive ferromagnetic material, one shallow and the other deep, rigidly secured respectively to opposite ends of said core-piece, said cup-shaped members each having a rim part of castellated form to provide a ring of angularly spaced pole teeth and the two rings of the pole teeth being intermeshed to form a single annular ring within which each tooth is bent at a slight angle towards the extended axis of the core-piece so as to give the said annular ring of pole teeth a frustoconical formation, an energizing winding within an insulating casing located on said core-piece between said cup-shaped members, the ends of said winding being connected to related external connection leads on an annular shaped printed circuit board within said casing and a multipolar disc-shaped rotor of ceramic permanent material frictionally mounted upon a bushing secured near one end of a rotor spindle rotatable in said bearing bushings so as to be positioned within said frustoconical ring of stator pole teeth.

INVENTOR
HENRY JOSEPH LOVEGROVE
By Young & Thompson
ATTYS.

3,555,324

SYNCHRONOUS MOTOR WITH DISCLIKE ROTOR

This invention relates to synchronous electric motors and is more particularly concerned with single-phase AC motors which are of small physical size and of the type widely employed at the present time for operating electric clocks, time switches and other apparatus.

One of the commonest forms of miniature synchronous electric motor comprises a rotor disc formed to present a plurality of magnetic poles at suitably spaced intervals around its periphery and which operates within a ring of stator poles which are caused to be magnetized by the energizing alternating current so as to be alternately of opposite magnetic polarity to one another. With such form of construction the stator system usually comprises two cup-shaped components of nonretentive magnetic material, one of small axial depth and the other of greater axial depth, each having the outer ends of their cylindrical regions of castellated form with the respective castellations interleaved by assembly of the stator cups upon a central core-piece which carries a magnetizing winding.

With such form of motor the rotor, which is permanently magnetized, lies relatively close to the bottom wall of the shallow stator cup and in consequence the magnetic attraction between the rotor and such cup wall sets up an axial thrust upon the rotor in a direction which causes the rotor to move towards the said bottom wall. This thrust is usually taken up by means of a simple single ball-type thrust bearing located at the bottom of a blind hole forming the main bearing for the rotor spindle. The presence of this form of thrust bearing, however, permits the output drive from the rotor to be taken only from the other end of the rotor spindle. When, as is often commercially desirable, facility for taking the motor output drive from either end of the spindle is required, the above-mentioned single ball form of thrust bearing cannot be employed, and it then becomes necessary to use other forms of thrust bearing involving annular contacting surfaces. Apart from imposing a much greater frictional load upon the rotor, such forms of thrust bearing tend to have a relatively short life, particularly when, as is usually the case with a small synchronous electric motor, it is operated continuously over a long period of time, often without any form of maintenance.

One object of the present invention is to provide an improved form of synchronous motor construction in which the need for a rotor thrust bearing operating under continuous load is avoided, thereby permitting the construction of a motor in which the output drive can be taken from either end of the rotor spindle without the disadvantageous effects of interengaging annular thrust bearing surfaces previously mentioned.

In accordance with the invention most, if not all, of the stator pole teeth surrounding the rotor disc are arranged each to be slightly convergent inwardly towards the axis of rotation of the rotor disc when this is produced beyond the rotor, thereby to set up a magnetic field gradient which provides an axial position of equilibrium for the rotor at which it is out of engagement with the adjacent stator wall or other fixed part.

In order that the nature of the invention may be better understood one particular constructional form of the invention will now be described by way of illustrative example only and with reference to the accompanying drawing in which:

FIG. 3 is an external elevational view of the motor shown in FIGS. 1 and 2;

FIG. 4 is an elevational view of a printed circuit member used for anchoring and interconnecting the ends of the motor coil winding and the external connecting leads therefor;

FIG. 5 is an elevational view of one preferred form of the magnetized rotor disc; while

Figure 1:
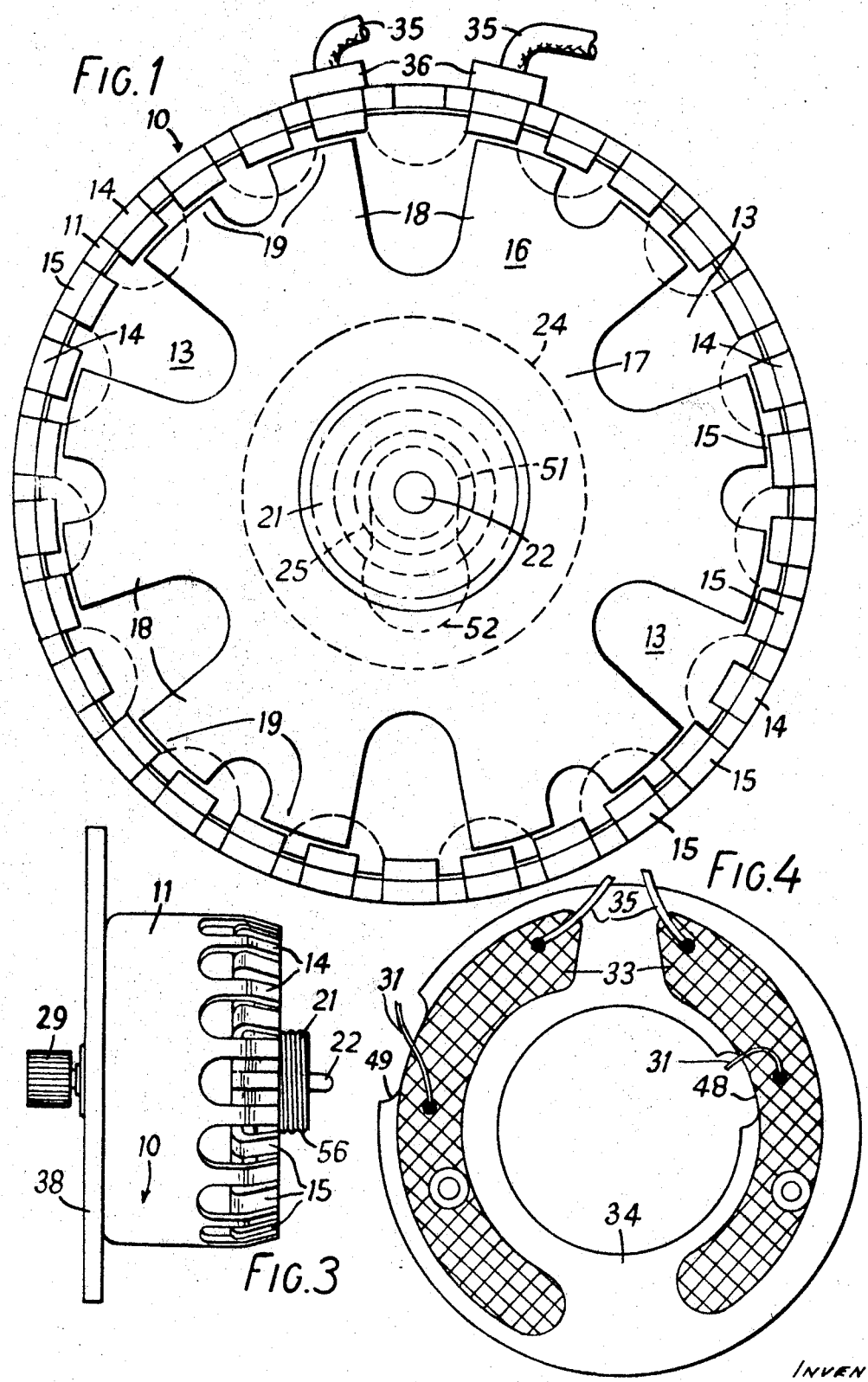
FIG. 1 is an end elevational view of a single phase AC synchronous electric motor constructed in accordance with this invention and taken from the rotor disc end of the rotor spindle.

Referring to the drawings the motor shown has a stator structure 10 which comprises a first stator cup 11 made of nonretentive ferromagnetic material secured at one end of a central cylindrical core 12 which is also of nonretentive ferromagnetic material. Securing is conveniently effected by providing a shouldered region 42 on the core and then upsetting the core material as shown at 43. The stator cup 11 has an axial depth greater than that of the axial length of the core 12 so that its rim extends beyond the end of the core opposite that to which it is attached. A second similar stator cup 13, of lesser axial depth than the cup 11, is similarly secured to the opposite end of the core 12. The axial depth of this second cup 13 is such that its rim lies in the same plane normal to the core axis as the rim of the cup 11.

The rim-forming regions of the two stator cups 11, 13 are each gapped or castellated to provide on each a ring of equispaced and generally axially directed pole teeth 14, 15 respectively. The spacing distance between each pair of teeth associated with either one of the cups is substantially greater than the tooth width. The two cups 11, 13 are so assembled on the core 12 that the respective pole teeth 14, 15 are intermeshed with the teeth of one cup lying nested within and midway between the teeth on the other cup so as to form an annular array or ring of pole teeth of which alternate teeth are connected magnetically to opposite ends of the central core 12 and consequently assume mutually opposite magnetic polarities when a magnet winding, as shown at 31, is disposed around the core 12 and is supplied with current.

Figure 5:
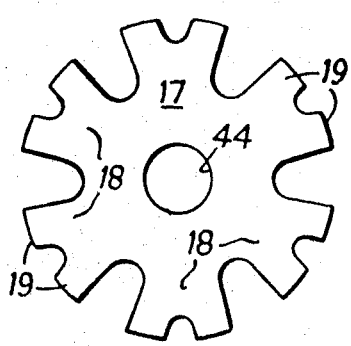

A rotor, indicated generally at 16, comprises a rotor disc 17, preferably formed of ceramic permanent magnetic material, is provided with six equispaced radially directed major poles 18. As shown more clearly in FIG. 5, each of these major poles is divided into two circumferentially spaced minor poles 19. The disc 17 is permanently magnetized so that alternate major poles are of opposite polarity. The circumferential widths of the major and minor poles and the spacing between each pair of minor poles are related in known manner to the similar widths and spacing dimensions of the stationary pole teeth 14, 15. The number of rotor poles and the number of stator pole teeth is selected in well-known manner in accordance with the desired output speed of motor relative to the frequency of the energizing AC supply.

The rotor disc 17 is provided with a central bore 44 which is received in snug-fitting but nonbinding relationship upon a shouldered region 20 of a bushing 21 which is force fitted upon a rotor spindle 22 near to one end thereof. This rotor spindle 22 has the form of a short length of constant diameter rod provided with hemispherically rounded ends. The shouldered region 20 of the bushing 21 provides an annular flange surface 23 against which the outwardly facing surface of the rotor disc 17 is resiliently pressed to establish a firm frictional contact therewith by means of a spring washer 24, conveniently one of domed shape as shown. This washer 24 is secured in the rotor disc clamping position by the entry of the reduced diameter region 51 of a keyhole slot 52 therein into an annular groove 25 in the bushing 21. The frictional drive connection which is thus provided between the rotor disc and the rotor spindle is particularly advantageous in connection with rotor discs made of ceramic magnetic material since it avoids many of the difficulties of assembly and fixing which are otherwise present. The bushing 21 is provided, on its largest diameter outer end, with a helically threaded region 56 which is primarily intended for the attachment of a withdrawing tool as described later but which can, if necessary, be modified to form an output worm drive member.

The rotor spindle 22 is rotatably supported in coaxial relationship with the surrounding ring of stator pole teeth 14, 15 by means of two identical metal bushings 26. Each of these bushings has the form of a cylinder which is bored axially to form a bearing surface for the rotor spindle. The bore of each cylinder is relieved by counterboring as shown, so that when the two cylinders are assembled with the counterbores in contiguous relationship two axially spaced bearing surfaces are provided for the rotor spindle with a lubricant reservoir 27 between them.

The cylindrical outer surface of each bushing 26 is so dimensioned that it is received snugly within a constant diameter axial bore 28 passing right through the core 12. Each bushing 26 is chamfered or rounded about its inner edges to facilitate the entry of such bushings into the bore hole 28 during assembly by an automated process and also to allow the subsequent securing of the bushings in position by appropriate upsetting of the metal of the core 12 as shown at 45 and 46.

The end of the spindle 22 opposite that carrying the rotor disc 17 is shown provided with a drive pinion 29. This pinion is force fitted on the spindle while a washer 30 of polytetrafluoroethylene (P.T.F.E.) or other low friction material is provided between the opposing surfaces of the pinion 29 and the adjacent bearing bushing 21.

The energizing winding 31 of the motor around the core 12 is enclosed and preferably sealed within a two-part hollow annular sheath or casing 32 made of plastic insulating material and formed with overlapping junction regions as shown at 47. The outer end walls on the respective casing halves are each provided with axially directed projections 39 which enter respectively into complementary locating holes 40 formed in the central platform regions of the stator cups 11 and 13 thereby to anchor the motor winding against rotation about the core 12.

The two ends of the relatively thin wire winding 31 are each secured, as by soldering, to separate electrically conductive areas 33 of a printed circuit board having the shape of an annular washerlike member 34 (see particularly FIG. 4). Two externally extending flexible connection leads 35 are similarly secured one to each of the conducting areas 33. These leads 35 are led out from the motor by way of insulating bushings 36 made integral with one of the halves of the winding casing 32. These bushings project through apertures in the cylindrical sidewall of the stator cup 11. The printed circuit member 34 is provided with gapped regions 48, 49 in its inner and outer edges to accommodate the wire ends of the winding 31. Such member 34 is disposed within the casing 32 so as to lie between one end surface of the winding 31 and the adjacent inner surface of an end wall of the casing 32, the conductive side of the circuit board being in contact with the casing wall.

Figure 2:
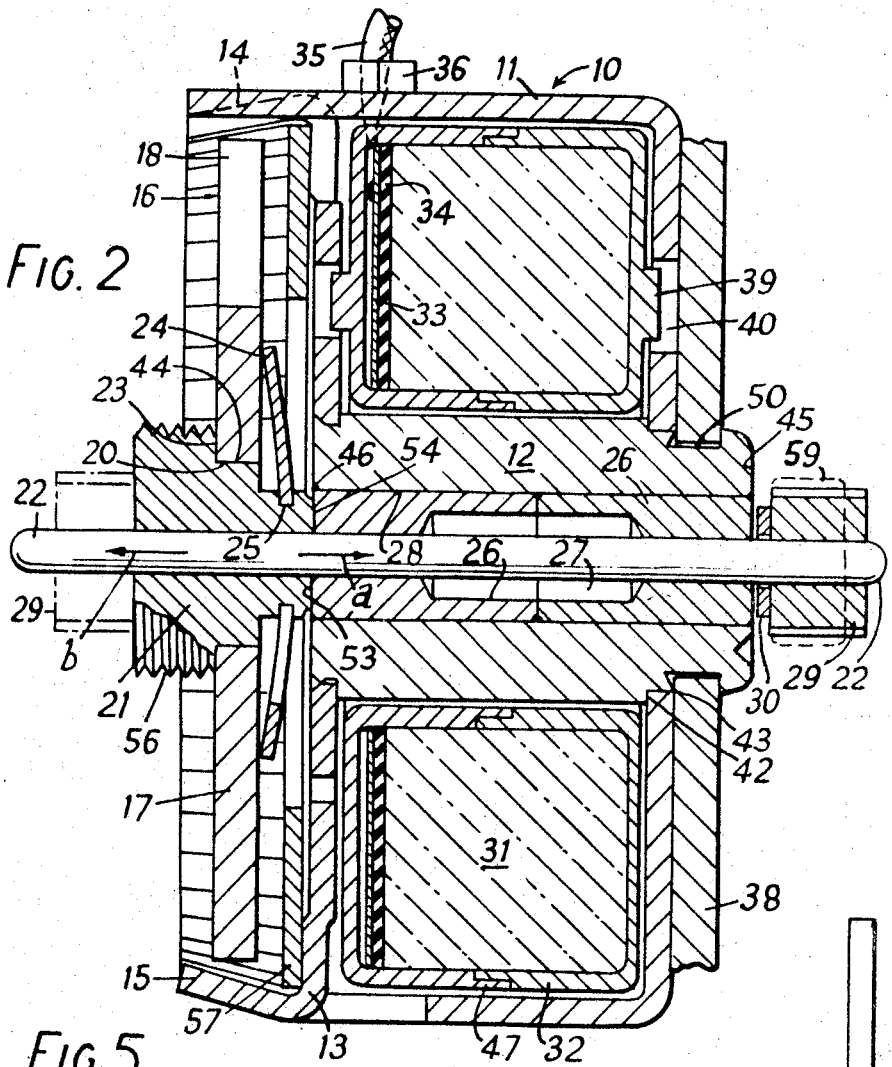
FIG. 2 is a diametral cross-sectional view of the motor shown in FIG. 1.

Referring now especially to FIG. 2, the thrust of the rotor spindle 22 into the stator (direction of arrow $a$) due to the magnetic attraction between the rotor disc 17 and the bottom wall of the stator cup 13 is either wholly or substantially neutralized by the provision of an equivalent magnetic pull in the opposite direction (arrow $b$) i.e. away from the bottom wall of such stator cup 13. If this oppositely directed pull can be made greater than the pull towards the bottom wall then a clearance can be created between the end surface 53 of the rotor bushing 21 and the facing end surface 54 of the bearing bush 26. This effect is obtained by forming all or nearly all of the stator poles 14 and 15 as shown so that they converge inwardly towards the rotor axis when the latter is produced beyond the rotor. Such inwardly convergent formation of the pole teeth may be effected either before or after assembly of the stator cups upon the central core. Accurate forming is assisted by the provision of an annulus 57 of nonmagnetic material, such as aluminum adjacent the base wall of the cup 13 before bending. Due to the decreasing annular gap dimension between the pole teeth and the rotor disc as the latter is displaced outwardly, such formation of the stator poles will clearly provide an outward thrust (direction of arrow $b$, FIG. 2) on the rotor spindle which increases as the rotor is moved to a position where its poles are most strongly attracted to the stator pole tips.

With such a construction there can be an axial position of unstable equilibrium of the rotor in which the axial pull (arrow $a$, FIG. 2) of the rotor disc 17 upon the bottom wall of the stator cup 13 is exactly balanced by the pull between the periphery of the rotor disc 17 and the outer ends of the stator pole teeth 14, 15. The various parts are so dimensioned and positioned that the rotor 16 is maintained substantially in such position of equilibrium whereby the pressures upon the contacting rubbing surfaces are held at a minimum.

Figure 6:
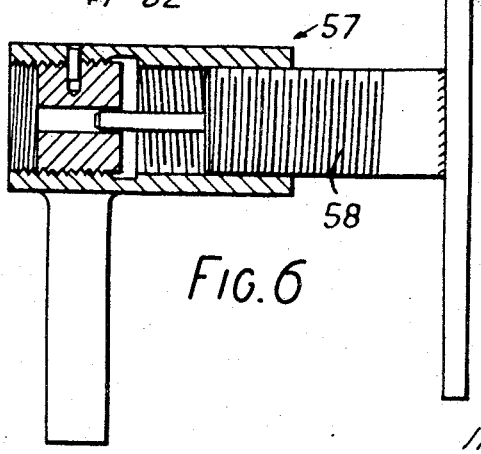
FIG. 6 is a part sectional view of a tool employed for effecting removal of the rotor disc to allow cleaning and lubricating of the motor bearings.

In the embodiment as shown the outer end of the rotor bushing 21 is formed with a screw thread 56. This permits the application of a tool as shown at 57 in FIG. 6 to such bushing whereby, by means of the further screw-threaded plunger system 58, the force fitted bushing 21 and the rotor disc 17 may readily be removed from the spindle 22 to allow cleaning and lubricating of the bearings.

The motor may incorporate any suitable form of one-way rotation device to ensure that, upon energization, the rotor spindle will rotate always in one chosen direction. Mounting arrangements for securing the motor in any desired position may be varied according to requirements. Preferably, however, and as shown, a separate suitable shaped mounting plate 38 is disposed adjacent the radial end wall of the deeper stator cup 11 and is located upon a reduced diameter end region 50 of the adjacent end of core 12 and is secured in fixed position by upsetting the metal of the core as shown at 45.

As the rotor spindle 22 is of constant diameter at each of its ends and as the pinion 29 is secured by force fitting thereon, such pinion may, if desired, be placed at the opposite end of the spindle as shown in chain-dotted lines, its original place being taken by a separate collar likewise force fitted in position as shown in chain-dotted lines at 59. In this way, a drive output may be provided from either end of the rotor spindle.

I claim:

1. A synchronous alternating current electric motor which comprises a stator structure including a cylindrical nonretentive ferromagnetic core-piece having an axial bore, bearing means in said axial bore, first and second cup-shaped stator elements of nonretentive ferromagnetic material, said first stator element having a first circular bottom wall rigidly secured at its center to one end of said core-piece and a shallow cylindrical wall part extending from the outer region of said bottom wall in a direction away from said core-piece, said second stator element having a second circular bottom wall rigidly secured at its center to the opposite end of said core-piece and a deep cylindrical wall part extending from the outer region of said second bottom around said core-piece towards said first stator element, each of said stator element cylindrical wall parts terminating in a castellated rim providing a ring of angularly spaced pole teeth with the teeth on one stator element intermeshed with the teeth on the other element for form a single ring of pole teeth, said pole teeth being bent inwardly to converge towards the axis of said core-piece when produced beyond the end carrying said first stator element whereby said single ring of intermeshed pole teeth is of frustoconical shape, an energizing winding surrounding said core-piece and within said second stator element, and a rotor structure including a permanently magnetized rotor disc provided with a plurality of magnetic poles at spaced intervals around its periphery, a rotor spindle journaled in said bearing means and rotatably supporting said rotor disc within said frustoconical ring of pole teeth and axial displacement inhibiting means for maintaining said rotor disc in the immediate vicinity of an axial position of unstable equilibrium at which the axial thrust due to the magnetic flux from said permanently magnetized rotor passing through said first circular bottom wall of said first stator element is equal to the counter axial thrust due to the magnetic flux from said rotor disc through said convergent pole teeth and said stator elements.

2. A synchronous electric motor according to claim 1 in which said rotor disc is of ceramic permanent magnetic material and is frictionally secured on said rotor spindle.

3. A synchronous electric motor according to claim 2 in which said spindle is provided with a rotor mounting bushing having an annular radially directed bearing surface against which one side of said rotor disc is held in frictional driving engagement by a spring clamping member.

4. A synchronous electric motor according to claim 1 in which the opposite ends of said rotor spindle are of the same diameter and in which a drive output pinion is arranged to be capable of being force fitted on either end of said spindle.

5. A synchronous electric motor as claimed in claim 1 in which the ends of said magnet winding are each secured to electrically conductive areas of an annular-shaped printed circuit board, external flexible connecting leads for said winding being also secured to said conductive areas and said printed circuit board member being located adjacent one end of said winding.

6. A synchronous electric motor according to claim 5 in which said winding is enclosed within a protective casing with said printed circuit board trapped between one end of the winding coil and an adjacent wall of said casing.

7. A synchronous electric motor according to claim 3 in which said rotor mounting bushing is force fitted on said rotor spindle and in which the end of said rotor mounting bushing facing away from said core-piece is provided with a screw-threaded region for the reception of a bushing-removing tool.